No. 846,322. PATENTED MAR. 5, 1907.
R. S. & H. C. LAZENBY.
WATER DISTILLING APPARATUS.
APPLICATION FILED FEB. 11, 1905. RENEWED JAN. 4, 1907.
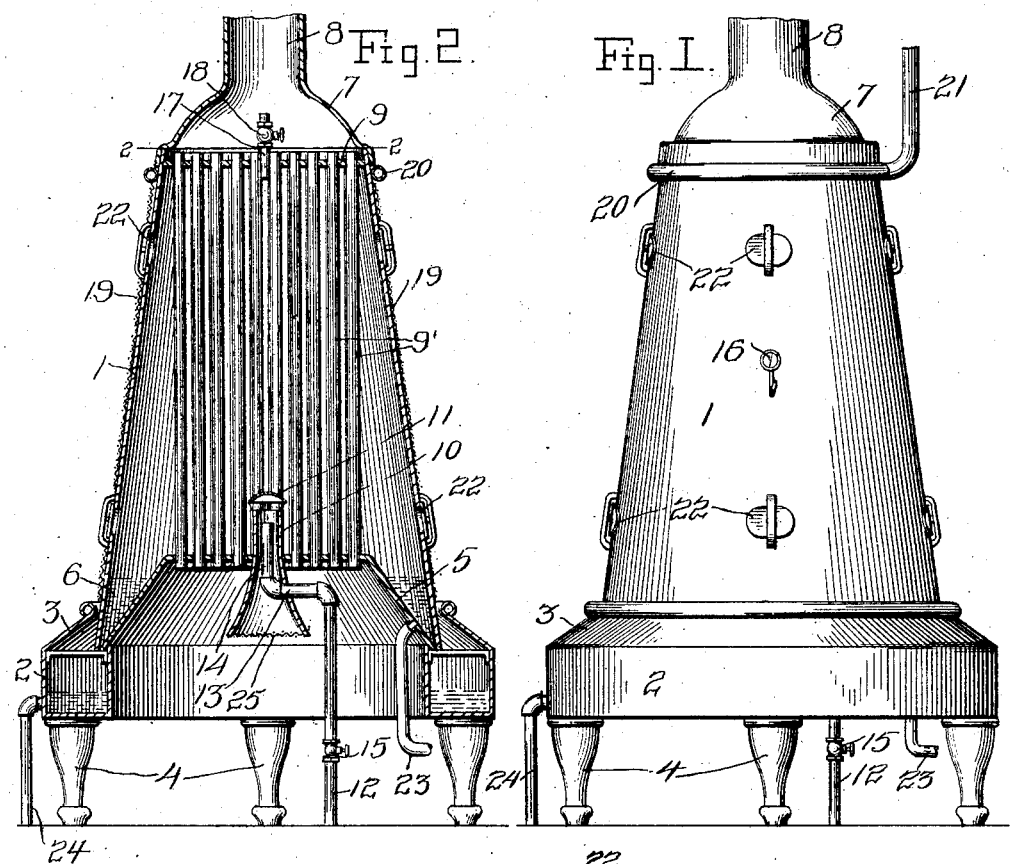
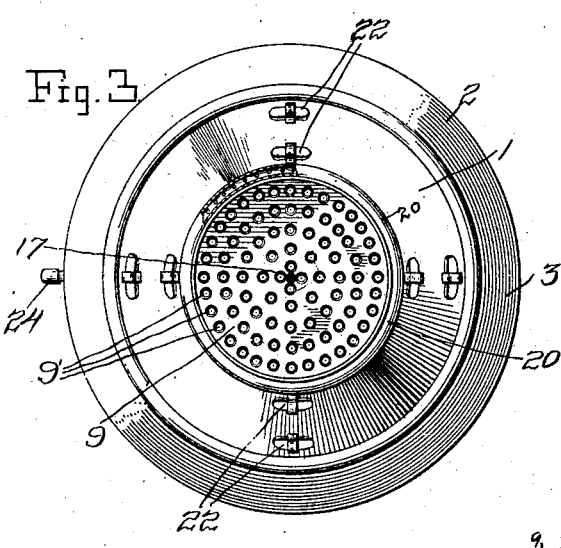
Witnesses
C. K. Reichenbach
M. E. Tucker
Inventors
R. S. Lazenby
H. C. Lazenby
By Chandler & Chandler
Attorneys

UNITED STATES PATENT OFFICE.

ROBERT S. LAZENBY AND HENRY C. LAZENBY, OF WACO, TEXAS.

WATER-DISTILLING APPARATUS.

No. 846,322.          Specification of Letters Patent.          Patented March 5, 1907.

Application filed February 11, 1905. Renewed January 4, 1907. Serial No. 350,818.

*To all whom it may concern:*

Be it known that we, ROBERT S. LAZENBY and HENRY C. LAZENBY, citizens of the United States, and each residing at Waco, in the county of McLennan and State of Texas, have invented a new and useful Distilling and Condensing Apparatus, of which the following is a specification.

This invention relates to apparatus for condensing steam in the process of distilling water.

During the ordinary process of water distillation there are evolved gases, known as "empyreumatic" gases, the presence of which in the distilled water gives to it the well-known flat and disagreeable taste.

The object of the present invention is to provide an apparatus in the operation of which these gases will be separated from the steam, so that when condensation takes place the water will be free from the gases. The process involved consists, broadly, in mixing air with the steam and then condensing the steam out of the mixture, so that the gases are combined with the air and are carried off by it.

A further object of the invention is to provide a structure wherein the escaping gases will be utilized to induce an initial and aid the subsequent circulation of air as a condensing medium through the apparatus.

Another object of the invention is to provide in a structure embodying air-flues such an arrangement of flues as will insure proper circulation of air to effect condensation under varying working conditions.

A still further object of the invention resides in the provision of a maximum condensing service in a minimum space and to secure rapid condensation with little or no loss of steam.

With the above and other objects in view the invention consists in the construction and arrangement of parts shown in the accompanying drawings, in which—

Figure 1 is a view in elevation of the apparatus. Fig. 2 is a vertical sectional view through the same, and Fig. 3 is a detail sectional view on the line 2 2 of Fig. 2.

Referring to the drawings, 1 denotes a frusto-conical drum or shell, and 2 an annular trough upon which the drum 1 is supported. The trough 2 is provided with a top or shield 3, which is inclined upwardly and inwardly from the outer edge of the trough and which terminates slightly short of the drum 1 for a purpose to be hereinafter described. The trough 2 is supported upon suitable legs 4.

From the lower edge of the drum 1 there rises a frusto-conical reëntrant bottom 5, the walls of which, together with a portion of the walls of the drum, form an annular trap or chamber 6 for the reception of the condensed water. A hood 7, provided with a stack 8, is supported upon the upper open end of the drum 1, and adjacent its said end the drum is provided with a header-plate 9, which is provided with a series of openings which register with openings formed in the top of the reëntrant bottom 5 and in which are engaged the upper and lower ends, respectively, of vertical air-flues 9'. Disposed centrally of the top of the reëntrant bottom 5 and extending therethrough is a substantially conical injector 10, which is open at its upper and lower end, as shown, the said upper end being provided with a deflector-cap 11, which is held in spaced relation from the said upper end of the injector. A steam-pipe 12, in communication with a suitable source of steam-supply, (not shown,) rises into the reëntrant bottom 5 and is provided with a lateral branch 13, piercing one side of the injector 10, and with a nozzle 14, rising vertically through the injector 10, so as to discharge the steam admitted through the said pipe against the said deflector-cap. The steam-pipe 12 is provided with a suitable cut-off valve 15, whereby the supply of steam may be regulated or entirely cut off. The steam-pressure within the body of the apparatus is indicated by a steam-gage 16. Piercing the header-plate 9 centrally is a pipe 17, which is provided with a valve 18. This pipe 17 serves as an exhaust-pipe for the empyreumatic gases generated within the drum during the process of condensation and extends upwardly into the stack 8.

The exterior of the drum is covered with absorbent material 19, preferably burlap, and embracing the upper portion of the drum and supported thereby is an annular spray-pipe 20, to which water is supplied by means of a supply-pipe 21, which leads from a source of water-supply, (not shown,) the pipe 20 being provided with perforations 20', through which water is designed to pass to wet the burlap or other covering, whereby the drum 1 may be cooled. At suitable intervals the body of the drum is pierced by hand-holes for use in setting up and cleaning the apparatus, and these holes are provided with any suitable form of closure 22. A pipe 23 leads from the trap or chamber 6 and serves as an outlet for the distilled water, and a pipe 24 leads from the trough 2 and serves as an outlet for the water discharged from the burlap covering, the upper edge of the cover or shield 3 of the trough being spaced from the walls of the drum, as stated, for the passage of the said water into the trough. The lower end of the injector 10 is provided with a screen or a foraminous plate 25, which serves to exclude foreign matter and to filter the air drawn into the drum through the said injector.

In operation steam is admitted through the pipe 12 and the jet 14 through the injector 10 and by reason of its passage through the said injector draws in air through the lower end of the same. The said air and steam being mixed at the upper end or mouth of the injector impinge against the under side of the deflector-cap 11. The steam being mixed with the air at this point serves to cleanse the air of any foreign matter, as the air is thoroughly sterilized by the hot steam. The mouth of the injector and the deflector-cap are so positioned as to cause the mixture of air and steam to be directed upon the lower portions of the air-flues 9'. It will thus be seen that as these two become heated the air contained in them will also become heated and will rise in the tubes, drawing in cold air after it, the said cold air serving to condense the steam. The exhaust-pipe 17 is provided, as stated, for the purpose of an exhaust for the empyreumatic gases formed in the process of distillation, and these gases being heated will rise rapidly to the said tube and into the stack 8, causing an additional draft through the stack, and aid in drawing cold air through the air-flues 9'.

The point of greatest condensation being at the lower portion of the drum, the same is tapered, as stated, so that steam not condensed in the lower portion of the drum will be directed inwardly toward the upper portion of the air-flues, this construction greatly lessening the waste of the steam, and consequently securing a more thorough condensation of the same.

What is claimed is—

1. A condensing apparatus comprising a chamber, air-flues passing through the chamber and having no communication therewith and arranged to effect a circulation of air therethrough, means for mixing air with the steam to be condensed, means for conveying the mixed air and steam into the chamber and in contact with the flues, a stack with which the exhaust ends of the flues communicate, and means for conveying the empyreumatic gases from the chamber into the stack in a direction to establish a draft therethrough.

2. A condensing apparatus comprising a chamber, air-flues passing through said chamber, and out of communication therewith, a steam-inlet arranged to discharge against the lower portions of said flues, and means for directing the steam not condensed by the lower portions of said flues against the upper portions thereof.

3. A condensing apparatus comprising a chamber, air-flues passing through said chamber and out of communication therewith, a steam-inlet arranged to direct steam outwardly against the lower portions of said flues, and means for returning the steam not condensed by the lower portions of said flues inwardly against the upper portion thereof.

R. S. LAZENBY.
H. C. LAZENBY.

Witnesses:
W. T. LOCKWOOD,
F. H. WHEELER.